(12) United States Patent
Senga et al.

(10) Patent No.: US 7,634,574 B2
(45) Date of Patent: Dec. 15, 2009

(54) COMMUNICATION CONTROL DEVICE, COMMUNICATION TERMINAL DEVICE, SERVER DEVICE, AND COMMUNICATION CONTROL METHOD

(75) Inventors: Satoshi Senga, Tokorozawa (JP); Go Nakano, Tokyo (JP); Sachiko Takeshita, Tokyo (JP); Ming Qiang Xu, Ichikawa (JP)

(73) Assignee: PANASONIC Corporation, Osaka (JP)

( * ) Notice: Subject to any disclaimer, the term of this patent is extended or adjusted under 35 U.S.C. 154(b) by 591 days.

(21) Appl. No.: 10/543,176

(22) PCT Filed: Jan. 29, 2004

(86) PCT No.: PCT/JP2004/000834

§ 371 (c)(1),
(2), (4) Date: Jul. 22, 2005

(87) PCT Pub. No.: WO2004/068806

PCT Pub. Date: Aug. 12, 2004

(65) Prior Publication Data

US 2006/0253888 A1   Nov. 9, 2006

(30) Foreign Application Priority Data

Jan. 30, 2003 (JP) ............................. 2003-021838

(51) Int. Cl.
G06F 15/16 (2006.01)
G06F 15/173 (2006.01)
H04B 7/00 (2006.01)

(52) U.S. Cl. ..................... 709/230; 370/310; 709/224
(58) Field of Classification Search ......... 709/220–224, 709/230; 370/310
See application file for complete search history.

(56) References Cited

U.S. PATENT DOCUMENTS 5,987,033 A * 11/1999 Boer et al. .................. 370/445
6,356,760 B1   3/2002 Suzuki
6,587,479 B1 * 7/2003 Bianchi et al. .............. 370/487
6,795,407 B2 * 9/2004 Chesson ..................... 370/311

(Continued)

FOREIGN PATENT DOCUMENTS

| CN | 1211152 | 3/1999 |
| JP | 9-051571 | 6/1995 |
| JP | 7-154856 | 2/1997 |
| JP | 2000 0209654 | 7/2002 |
| JP | 2002-209654 | 7/2002 |

OTHER PUBLICATIONS

English language Abstract of JP 2002-209654.
English language Abstract of JP 9-209654.

(Continued)

*Primary Examiner*—George C Neurauter, Jr.
(74) *Attorney, Agent, or Firm*—Greenblum & Bernstein P.L.C.

(57) ABSTRACT

A communication control apparatus, communication terminal apparatus, server apparatus, and communication control method are provided that continue video and/or voice communication in a way that feels seamless to the user even when communication conditions change in a mobile environment. Newly introducing a lower layer management section that notifies an upper layer of lower layer information such as field intensity and network congestion into a conventional communication terminal apparatus, which is configured in such a way that this lower layer information is concealed from the application, enables the connection control section that provides the application's service generation environment to recognize lower layer information directly, and makes possible various kinds of status determination and control changes based on lower layer information at the application level.

9 Claims, 10 Drawing Sheets

U.S. PATENT DOCUMENTS 6,845,397 B1 * 1/2005 Lavian et al. ............... 709/230
2006/0253888 A1 * 11/2006 Senga et al. ................ 725/123

OTHER PUBLICATIONS

English language Abstract of JP 7-154856.

English language Abstract of JP 2002-209654., published Jul. 3, 2002.

English language Abstract of JP 9-209654., published Jun. 16, 1995.

English language Abstract of JP 7-154856., published Feb. 18, 1997.

\* cited by examiner

| DEVICE CONTROL | FIELD INTENSITY | Level 2 |
| --- | --- | --- |
| | RADIO LINK | UP |
| | MODULATION SCHEME | CCK |
| NETWORK DISTRIBUTION CONTROL | CONGESTION STATE | Level 4 |
| | PREFIX | ID 3 |
| | RECEIVE BUFFER SIZE | 512KB |
| | NUMBER OF RETRANSMISSIONS | 3 |

FIG.6A

| NETWORK CONTROL | AUTHENTICATION ID |
| --- | --- |
| | BANDWIDTH |

| SIGNALING CONTROL | CONNECTION DESTINATION IP, PORT NUMBER, SESSION ID |
| --- | --- |
| | BODY INFORMATION |

| TRANSMIT DATA CONTROL | VIDEO/ VOICE CODING PARAMETER |
| --- | --- |
| | TRANSMISSION/ RECEPTION FORMAT |

FIG.6B

COMMUNICATION CONTROL DEVICE, COMMUNICATION TERMINAL DEVICE, SERVER DEVICE, AND COMMUNICATION CONTROL METHOD

TECHNICAL FIELD

The present invention relates to a communication control apparatus, communication terminal apparatus, server apparatus, and communication control method that are used in a mobile network system employing radio access points and radio base stations, and enable conversational type and streaming type media services, for example, to be provided to users.

BACKGROUND ART

In a wired network system typified by the current Internet, information of the lower layers, and in particular the first through third layers (physical layer, data link layer, and network layer), of the OSI (Open System Interconnection) hierarchical model is concealed from and not detected by upper layer applications. The nth layer of a communication terminal of such a system is configured so that communication is performed with the nth layer of a far-end terminal via a function provided from layer (n−1) of the terminal, and therefore an upper layer application can operate as long as it can obtain information of one layer lower, and does not need to obtain information of two or more layers lower.

That is to say, with a conventional communication terminal apparatus, control relating to data transmission is performed only between a device control section that performs physical layer and data link layer processing and a network distribution control section that performs network layer processing, and reporting of information to an application is performed only via transport layer processing.

When data communication is performed by radio, also, a system that performs the above-described hierarchical processing is basically used as-is. For example, a technology that takes variations in radio communication quality into consideration in performing data communication is disclosed in Unexamined Japanese Patent Publication No. 2000-209654. However, e-mail and other application programs disclosed in this publication simply issue unilateral data transmission requests to a data communication control section without concern for radio communication conditions, and subsequently the data communication control section originates a call automatically when the radio communication quality satisfies predetermined conditions, and when the call is established, transmits data that has been waiting for transmission.

Radio connections are now becoming the mainstream on the Internet, and it has become possible for users to maintain Internet access while moving around freely by using the advantages of radio. With this kind of Internet access, handover is possible not only between radio base stations and between radio access points, but also between a radio base station and a radio access point, and a user can maintain Internet access while moving between a number of radio networks.

With mobile network systems of this kind, it is hoped to implement not only asynchronous type communication such as e-mail, but also services that handle multimedia communication such as video and voice requiring real-time capability, including voice calls and video streaming services, for example.

However, data transmission by radio while moving does not offer the kind of stable communication quality provided by wired systems, and may be subject to fluctuations in field intensity or interruption of communication associated with movement, as well as major changes in the transmission band when moving to a different radio network. Thus it is difficult to achieve stable operation of an application for multimedia communication requiring real-time capability in the upper layer of a device control section that handles unstable radio communications.

DISCLOSURE OF INVENTION

It is an object of the present invention to implement a service in mobile communications employing multimedia including at least one of video and/or voice, whereby communication can be maintained even if radio communication quality is poor, connection is lost, or the user moves into a different network, and that maintenance of communication is felt to be seamless by the user.

The gist of the present invention is that control related to a session between a media stream data transmission source and reception destination (also referred to as a media session) is performed based on information relating to communication conditions of a layer lower than the transport layer (for example, by conveying information relating to radio layer or network layer communication conditions directly to a layer higher than the transport layer without going via the transport layer).

By this means, when a video or voice application requiring real-time capability is handled by a communication terminal apparatus whose communication conditions change from moment to moment as the communication terminal apparatus moves, switching can be performed more rapidly on the application side to a service adapted to a change in communication conditions, and a multimedia communication service can be provided that feels more seamless to a user in a mobile environment.

According to one aspect of the present invention, a communication control apparatus employs a configuration having a detection section that detects at least one of a radio environment or a network environment; a management section that stores a detected radio environment or network environment, and monitors whether or not a change has occurred in the radio environment or network environment; and a control section that performs application communication service control when a change has occurred in the radio environment or network environment.

According to another aspect of the present invention, a communication terminal apparatus employs a configuration having the above-described communication control apparatus.

According to yet another aspect of the present invention, a server apparatus employs a configuration having the above-described communication control apparatus.

According to a still further aspect of the present invention, a communication control method has a step of detecting at least one of a radio environment or a network environment; a step of storing a detected radio environment or network environment, and monitoring whether or not a change has occurred in the radio environment or network environment; and a step of performing application communication service control when a change has occurred in the radio environment or network environment.

BRIEF DESCRIPTION OF DRAWINGS

FIG. 6A is a drawing showing an example of items stored in a management database and the value of each item;

FIG. 6B is a drawing showing an example of the format of information reported to each control section by the connection control section;

BEST MODE FOR CARRYING OUT THE INVENTION

With reference now to the accompanying drawings, embodiments of the present invention will be explained in detail below.

Embodiment 1

Figure 1:
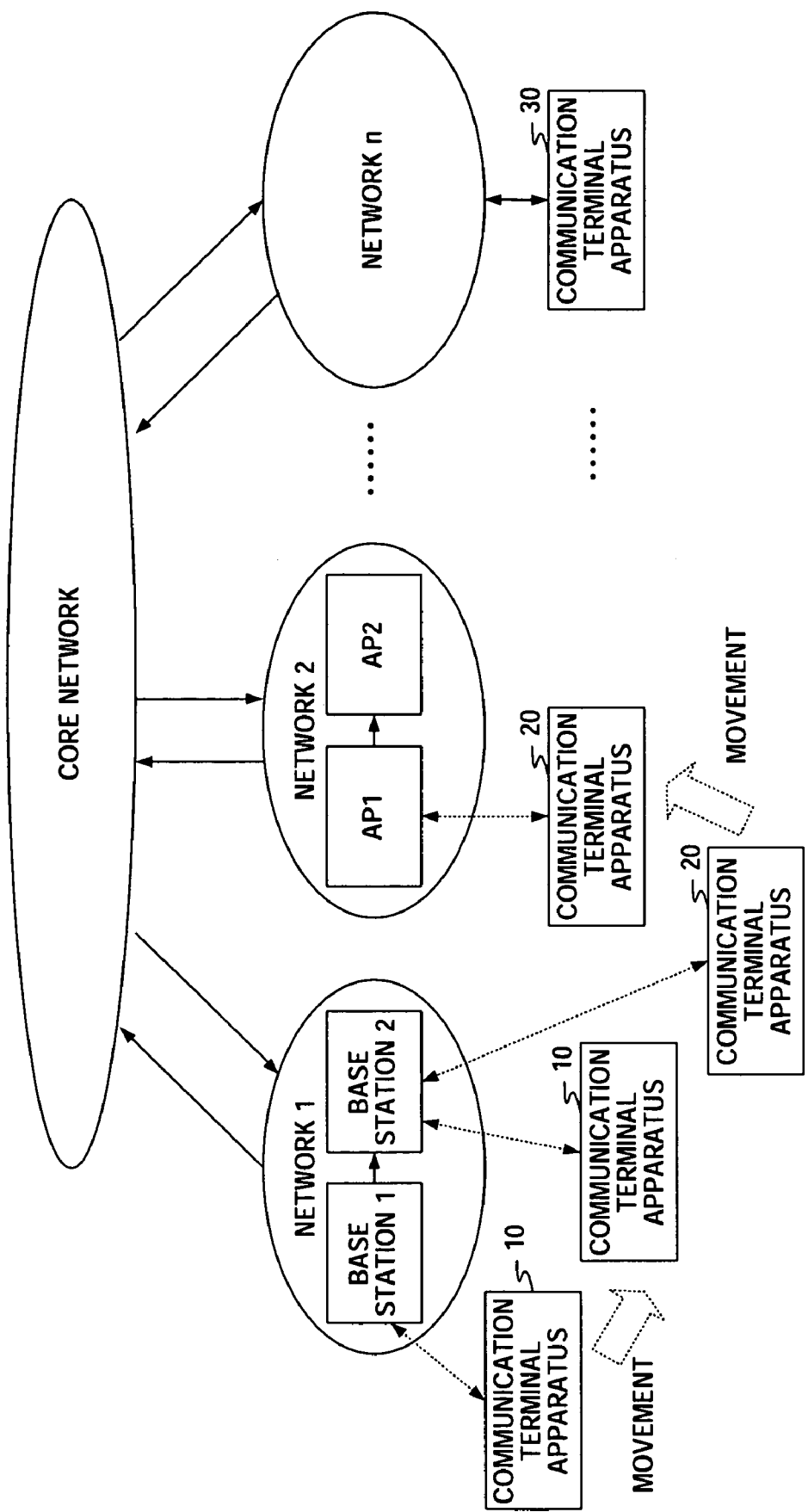
FIG. 1 is a drawing showing an example of the overall configuration of a network according to Embodiment 1 of the present invention.

FIG. 1 is a drawing showing an example of the overall configuration of a network according to Embodiment 1 of the present invention.

In FIG. 1, networks 1 through n are domain-unit networks such as LANs (Local Area Networks) or WANs (Wide Area Networks), with network 1 including a plurality of radio base stations (base station 1 and base station 2), and network 2 including a plurality of radio access points (AP1 and AP2), for example. That is to say, each of networks 1 through n corresponds to, for example, a public mobile phone network, private premises radio LAN, hot spot, home radio network, or the like, and is here assumed to be an IP-based network. These individual domain networks are connected to a core network typified by the Internet.

Communication terminal apparatuses 10 through 30 perform video or voice communication on a one-to-one or one-to-many basis. If, for example, communication terminal apparatus 10 moves and changes from a state in which it receives radio waves from base station 1 to a state in which it receives radio waves from base station 2, handover is performed between the base stations, and communication terminal apparatus 10 can continue to perform its pre-movement communication after the movement without interruption. The same applies to the case of movement from the connection range of AP1 to the connection range of AP2.

Also, if a communication terminal apparatus moves between networks, network layer handover (handover via the networks) is performed, and communication can be maintained. That is to say, if, for example, communication terminal apparatus 20 moves and changes from a state in which its is connected to base station 2 to a state in which its is connected to AP1, communication processing can be continued regardless of the fact that communication terminal apparatus 20 has moved to a different network (here, from network 1 to network 2).

Figure 2:
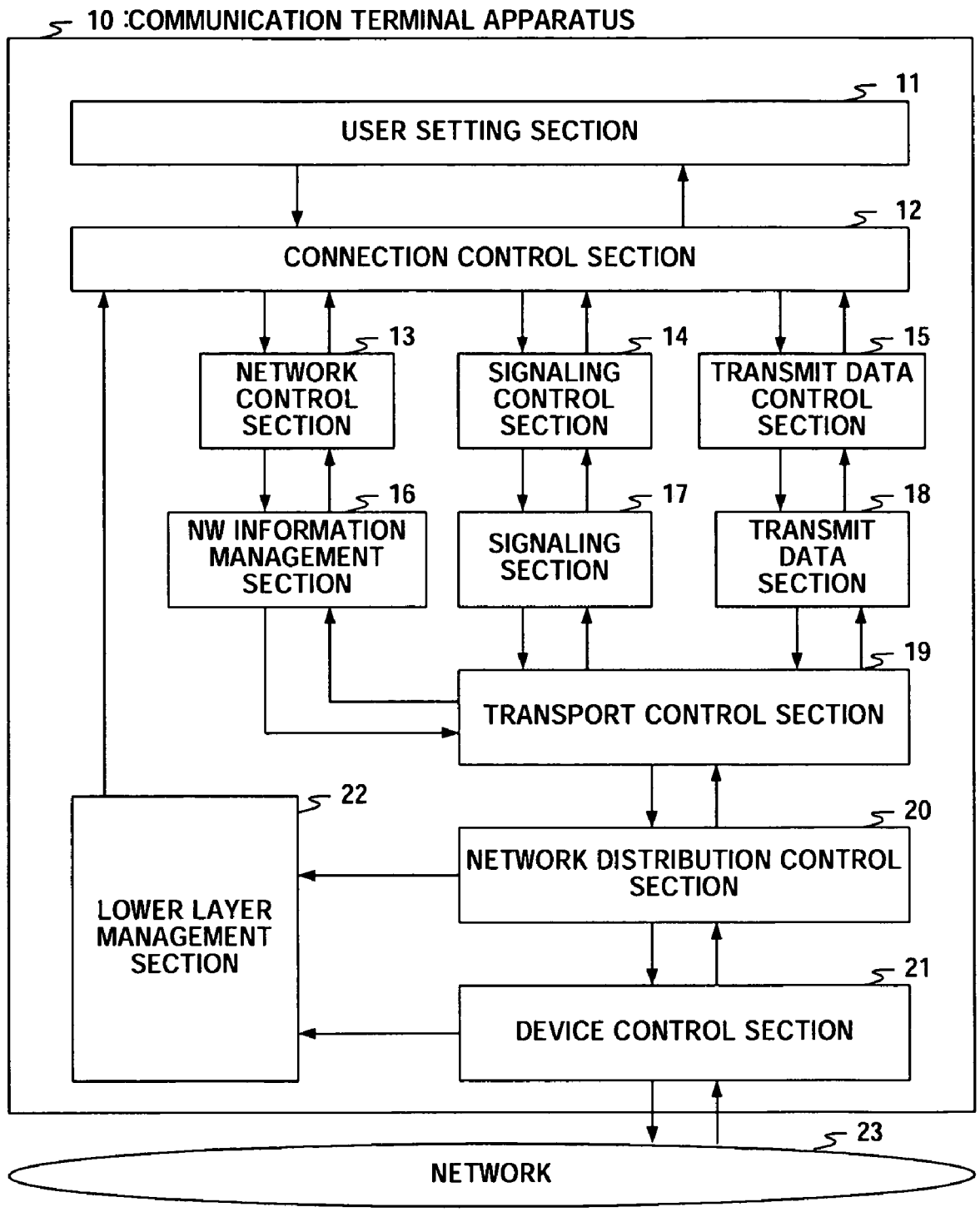
FIG. 2 is a block diagram showing the internal configuration of a communication terminal apparatus according to Embodiment 1.

FIG. 2 is a block diagram showing the internal configuration of communication terminal apparatus 10 according to Embodiment 1 of the present invention. Communication terminal apparatus 10 may be a mobile telephone apparatus, or may be a PDA or personal computer with a function for connection to a radio network. Communication terminal apparatuses 20 and 30 are also assumed to have the same kind of configuration as communication terminal apparatus 10.

Internally, communication terminal apparatus 10 has a hierarchical configuration, comprising connection control systems 12 through 18 above the transport layer, a transport control section 19 that performs transport layer processing, and data transmission control systems 20 and 21 below the transport layer. Also, in this embodiment, a lower layer management section 22 is newly provided to enable information relating to communication conditions of a layer lower than the transport layer of the communication terminal apparatus to be conveyed directly to a layer higher than the transport layer.

The upper connection control systems include a connection control section 12, a network control section 13, a signaling control section 14, and a transmit data control section 15.

Connection control section 12 is included in an application program, or used by an application program, and has a function of receiving a service request from a user and converting the service definition information to a format that can be interpreted and executed by network control section 13, signaling control section 14, and transmit data control section 15 (hereinafter referred to collectively as "control sections").

Based on service definition information from connection control section 12 and call information from signaling section 17, control sections 13 through 15 check the service conditions and software execution environment controlled by connection control section 12, and issue service execution directives to NW (network) information management section 16, signaling section 17, and transmit data section 18 as necessary.

Transport control section 19, and lower-level data transmission control systems comprising network distribution control section 20 (performing network layer processing) and device control section 21 (performing radio device control—that is, physical layer and data link layer processing), transmit and receive data created by the high-level connection control systems to/from a network 23, and implement the service desired by the user.

Device control section 21 can handle radio modulation schemes used in a plurality of networks in which communication terminal apparatus 10 can perform data transmission/reception. Network distribution control section 20 supports mobile IP (stipulated in RFC2002 of the Internet Engineering Task Force (IETF)), for example, whereby communication terminal apparatus 10 is able to carry out data transmission and reception in a plurality of different kinds of networks.

The individual sections of communication terminal apparatus 10 may be implemented by means of hardware or software, or a combination thereof.

The above sections will now be described in greater detail. Lower layer management section 22 uses a database to manage communication environment conditions detected by device control section 21 and network distribution control section 20 (detected by means of general-purpose signals, control information, performance monitoring, fault monitoring, and so forth). Lower layer management section 22 reports various kinds of information recorded in the database to connection control section 12, which is an upper layer section. Specifically, lower layer management section 22 records, for example, information for identifying network 23 to which communication terminal apparatus 10 belongs, information on the modulation scheme used in this network 23, information relating to radio communication field intensity, and so forth, in the database, and in the event of a change in the recorded information, reports that information to connection control section 12.

As connection control section 12 is a part of an application, or is used directly by an application, through the operation of lower layer management section 22, radio device or network layer (typically Internet Protocol layer) communication conditions are reported directly to the application, and communication terminal apparatus 10 can perform optimal control of video, voice or such like data transmission from the application side. That is to say, connection control section 12 of an application is able to ascertain movement to a different network, radio wave conditions, transmission traffic, and so forth, and can implement various kinds of services centered on video/voice applications.

Connection control section 12 provides a service generation environment, and has a function of enabling rapid application and service deployment. Specifically, connection control section 12 controls three kinds of functions: network centered service functions such as band control and authentication (corresponding to network control section 13), a signaling based control function that performs call connection to implement communication (corresponding to signaling control section 14), and user centered application service functions including profiling, content (video/voice), and so forth (corresponding to transmit data control section 15).

A user setting section 11 is an input/output section whereby the user performs communication terminal apparatus settings and operations, and comprises a screen, buttons, a mouse, and so forth. Connection control section 12 also controls execution of commands specified by the user by means of this user setting section 11.

Figure 3:
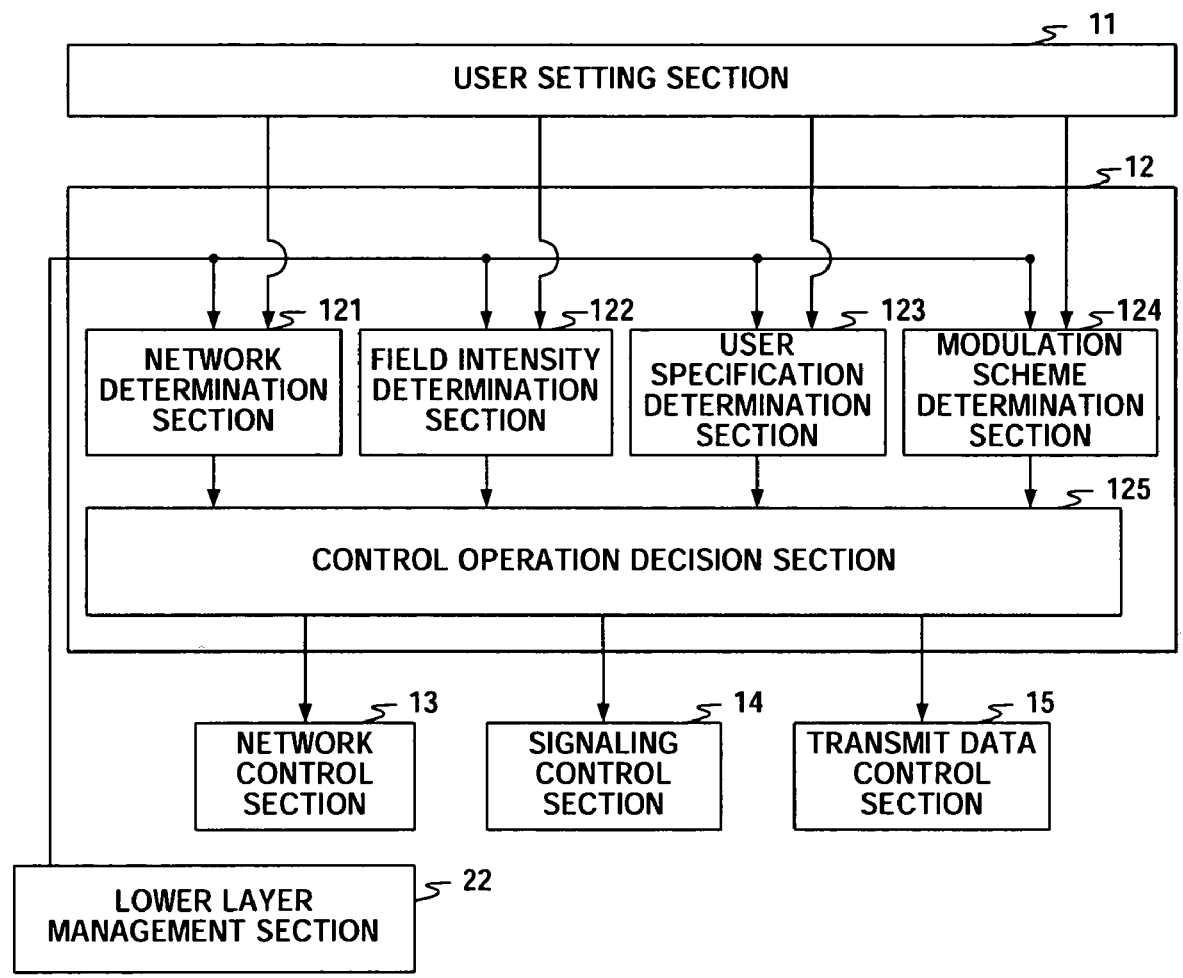
FIG. 3 is a block diagram showing the detailed configuration of a connection control section according to Embodiment 1.

The detailed configuration of connection control section 12 according to Embodiment 1 will now be described with reference to FIG. 3. As shown in FIG. 3, connection control section 12 has a network determination section 121, a field intensity determination section 122, a user specification determination section 123, a modulation scheme determination section 124, and a control operation decision section 125.

Network determination section 121 determines whether or not the network to which communication terminal apparatus 10 belongs has changed, based on information reported from lower layer management section 22. Specifically, network determination section 121 detects that a change in a prefix serving as the network identifier has been reported by lower layer management section 22, and determines that the network has changed.

Field intensity determination section 122 determines whether or not field intensity indicating the state of radio communication has changed, based on information reported from lower layer management section 22. Specifically, field intensity determination section 122 receives notification that the field intensity recorded in the database of lower layer management section 22 has changed, and determines that the field intensity has changed.

User specification determination section 123 determines whether or not information recorded in the database of lower layer management section 22 has been changed to a value set by user setting section 11. User specification determination section 123 monitors all the information recorded in the aforementioned database, and detects that the communication environment is in the state the user has set via user setting section 11.

Modulation scheme determination section 124 determines whether or not the modulation scheme used by the network to which communication terminal apparatus 10 belongs has changed, based on information reported from lower layer management section 22. Specifically, modulation scheme determination section 124 receives notification that the modulation scheme recorded in the database of lower layer management section 22 has changed, and determines that the modulation scheme has changed.

Control operation decision section 125 decides on an operation for service control in accordance with the determinations of the above-described four determination sections. That is to say, control operation decision section 125 decides on a control operation such as restricting the band for content (video/voice) transmission, or transmitting predetermined signaling information, for example, in accordance with changes in the network, field intensity, modulation scheme, and so forth. These control operations are executed by control sections 13 through 15.

Referring to FIG. 2 again, network control section 13 performs network transmission band control and authentication for a real-time application. Specifically, network control section 13 performs setting of network transmission service quality control and authentication information. Then NW information management section 16 adds information for transmitting/receiving service quality and authentication information controlled by network control section 13 to/from network 23.

Signaling control section 14 controls the state of a call when call connection to the communicating party is performed. A call in this case denotes a session set up by the session layer (the layer above the transport layer) or by higher layers. There are three call states: idle, call connecting, and call established. Based on the call state controlled by signaling control section 14, signaling section 17 then creates information used in call connection when there us a call connection request (far-end address, port number, and so forth), and adds information for transmitting/receiving data for establishing or clearing a call to a communicating party to/from network 23.

Transmit data control section 15 performs creation and control of data used in real-time communication, such as video and voice data. The created data is coded/decoded data. Then transmit data section 18 adds information for transmitting/receiving the video, voice, or other data created by transmit data control section 15 to/from network 23.

Before data created in an upper layer is sent to network distribution control section 20, transport control section 19 links each data to a corresponding higher-level function (NW information management section 16, signaling section 17, or transmit data section 18), and when data received by a lower layer is accepted from network distribution control section 20, transport control section 19 distributes that data to the appropriate higher-level function.

Network distribution control section 20 sets address information and so forth necessary for transmitting data to network 23, and transmits/receives created data to/from network 23 via device control section 21.

Device control section 21 controls a radio device (radio) necessary for performing radio communication.

Figure 4:
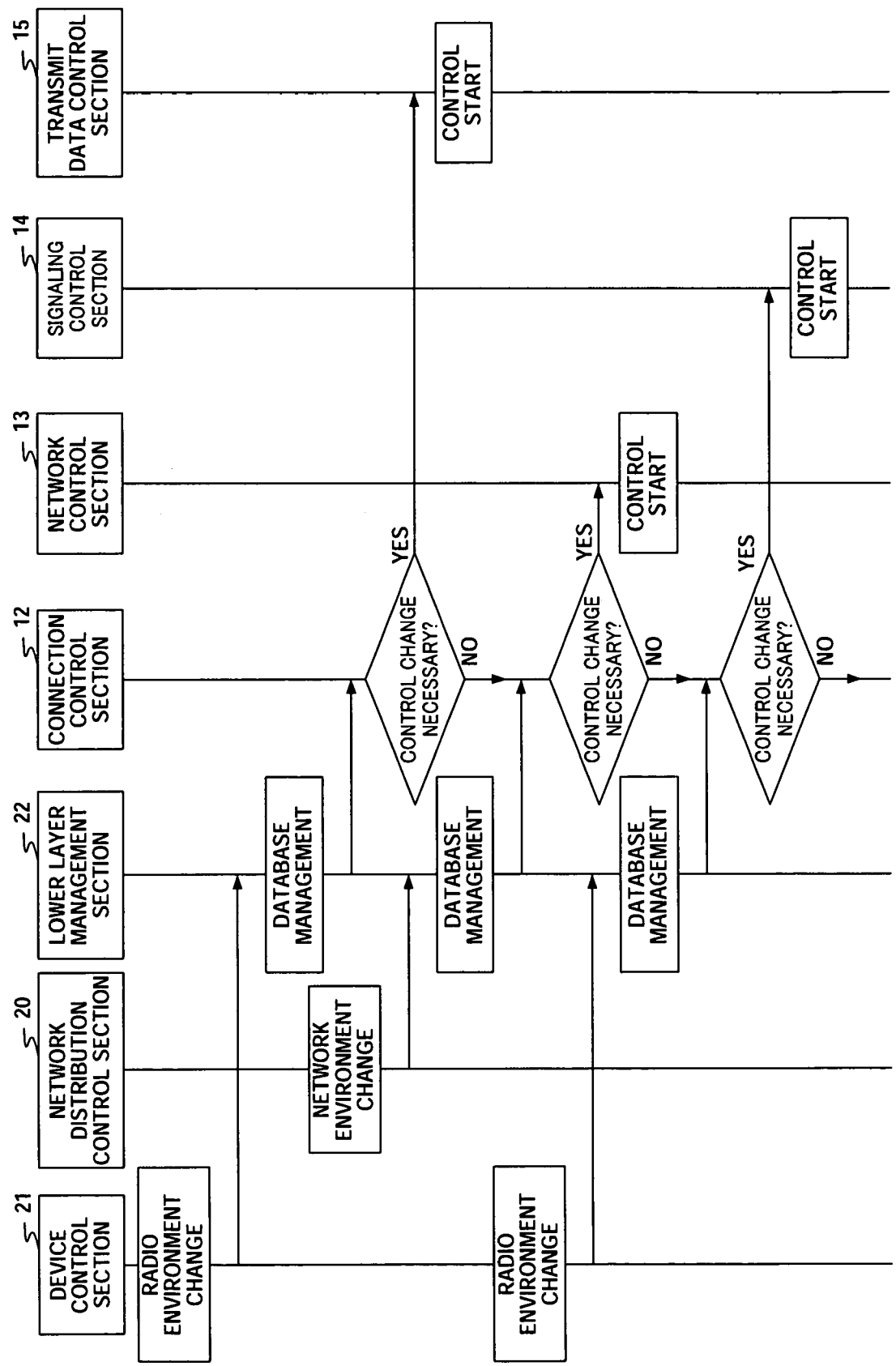
FIG. 4 is a sequence diagram exemplifying the relationship of the operations of the various sections of a communication terminal apparatus according to Embodiment 1.
Figure 5:
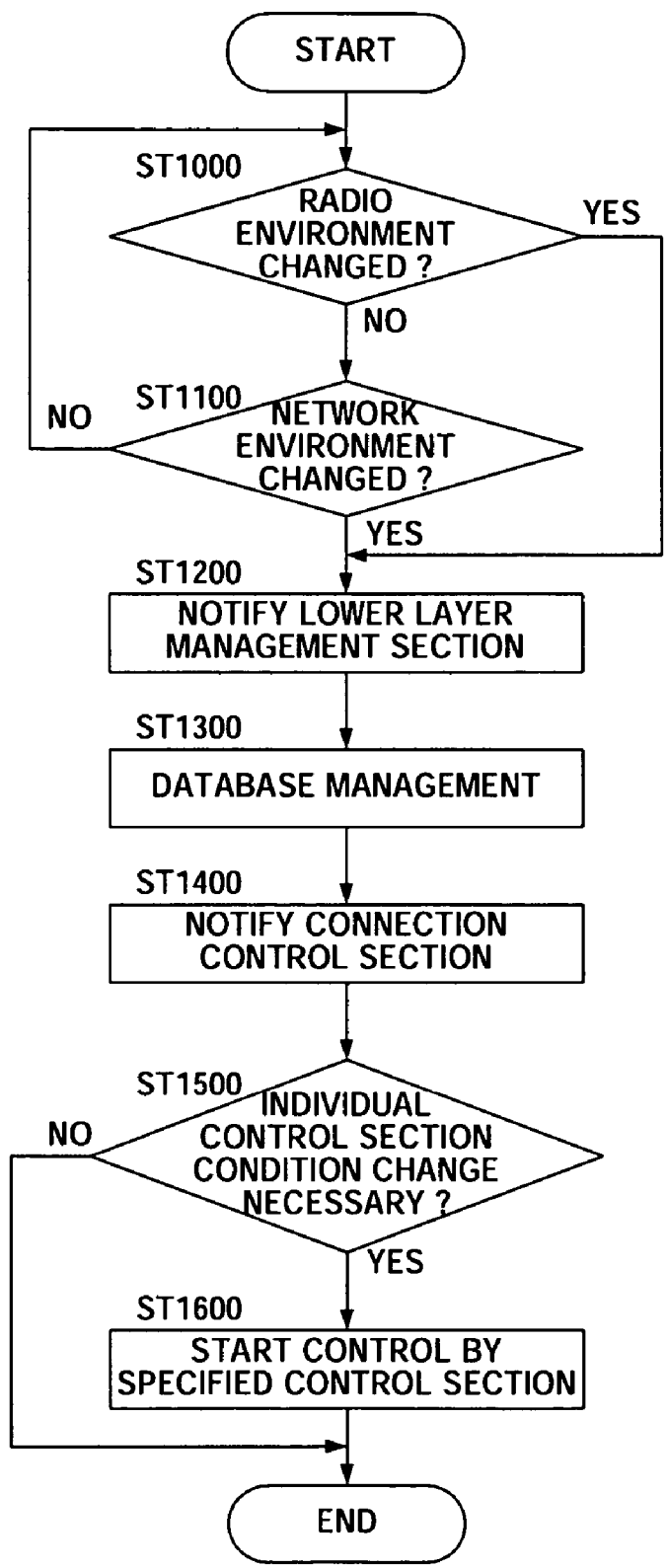
FIG. 5 is a flowchart showing an example of the processing of a communication terminal apparatus according to Embodiment 1.

The operation of communication terminal apparatus 10 according to this embodiment will now be described in detail with reference to the sequence diagram shown in FIG. 4 and the flowchart shown in FIG. 5. FIG. 4 is a sequence diagram exemplifying the relationship of the operations of the various sections of communication terminal apparatus 10, and FIG. 5 is a flowchart showing the processing procedure of communication terminal apparatus 10. Communication terminal apparatus 10 is assumed to perform data communication for video, voice, and such like communications via radio access points and radio base stations. At this time, the connection mode may be a one-to-one mode or a communication mode such as a multipoint conference involving multiple persons.

The user of communication terminal apparatus 10 can move around freely, making use of the advantages of radio. Here, whether or not the radio environment has changed is monitored and determined constantly by device control section 21 (ST1000), and if device control section 21 detects that the radio field intensity has weakened during movement, for example, the value of the field intensity after the change (or the level value if the field intensity is indicated by a plurality of levels) is reported to lower layer management section 22 (ST1200). Lower layer management section 22 writes the reported value in the field intensity location in its management database (ST1300).

Device control section 21 not only informs lower layer management section 22 of a change in the field intensity, but also determines whether or not the state of the radio link (link connected state (UP) or disconnected state (DOWN)) has changed, and informs lower layer management section 22 if a change is detected (ST1200). Lower layer management section 22 then writes the reported change in the relevant location in its management database (ST1300).

Device control section 21 may also inform lower layer management section 22 each time the modulation scheme (type of radio signal method) changes, and/or each time the radio access point congestion state changes, and write to the location of the changed item in the management database. Not only changes in the radio access point congestion state (the number of terminals currently using that radio access point), but also changes in the radio base station congestion state maybe managed. These items of information are classified as device control information in the management database of lower layer management section 22 as shown in FIG. 6A, for example. FIG. 6A shows an example of items stored in the management database of lower layer management section 22 and the value of each item.

Meanwhile, in parallel with the detection of radio environment changes by device control section 21 as described above, network distribution control section 20 detects changes in the network environment (ST1100). If, for instance, network distribution control section 20 detects a change in the network prefix (comprising predetermined high-order bits of the IP address, for example, and serving as a network identifier (ID)), network distribution control section 20 reports the prefix value (network ID) after the change to lower layer management section 22 (ST1200). Lower layer management section 22 then writes the reported value in the prefix location in its management database (ST1300).

Network distribution control section 20 may also similarly inform lower layer management section 22 not only in the event of a change in the prefix, but also when the receive buffer size or the number of retransmissions changes, and write to the location of the changed item in the management database.

The receive buffer size is a parameter that determines the amount of data sent from the communicating party that is temporarily stored in the terminal. The data transmitting side continuously transmits an amount of data that fills this receive buffer, and the data receiving side notifies the transmitting side of the end of reception when this receive buffer is full. An optimal value is selected for this receive buffer size according to the state of the network so that exchanges between the transmitting side and receiving side are not excessive, and the loss is not too great if part of the data cannot be received.

The number of retransmissions is a value obtained by counting the number of times the same data has been retransmitted by the transmitting side when the receiving side sends the transmitting side the number of a packet that has been lost during transmission and not received, and the transmitting side resends the packet indicated by that number.

These items of information are classified as network distribution control information in the management database of lower layer management section 22 as shown in FIG. 6A. Detection and management of radio environment changes by device control section 21 and detection and management of network environment changes by network distribution control section 20 are carried out in parallel, as shown in FIG. 4.

Lower layer management section 22 constantly monitors whether or not a newly reported value has been written to the management database. Each time there is a write to the management database, the change indicated by the write is reported to connection control section 12 of the application (ST1400). The information reported here is assumed to be only information on the changed item when there are a plurality of items in the management database. These series of operations (from detection of a radio environment change to database management, and from detection of a network environment change to database management) are carried out simultaneously and in parallel in the various sections, as shown in FIG. 4.

Connection control section 12 performs application control based on the reported information. Since the degree of change of a particular radio environment or network environment item that should cause application control to be changed differs according to the type of application or the wishes of the user, lower layer management section 22 automatically performs a write to the management database and notification of connection control section 12 when an item changes, and whether or not application control should be changed in accordance with that change is determined on the application side—that is, by connection control section 12 (ST1500).

To be specific, a change of application control is performed by a change item being determined by network determination section 121, field intensity determination section 122, user specification determination section 123, or modulation scheme determination section 124, and service definition information or the like conveyed to transmit data control section 15 being changed by control operation decision section 125. At this time, information of the format shown in FIG. 6B, for example, is reported from control operation decision section 125 to control sections 13 through 15.

That is to say, when, for example, connection control section 12 is informed from lower layer management section 22 that the radio field intensity has changed from level 2 to level 5 (communication conditions have improved), it is determined by field intensity determination section 122 that the field intensity has changed, and as a result of this determination, it is determined by control operation decision section 125 that a change is necessary to improve the image quality and/or sound quality in video/voice communication currently in progress. Information relating to transmit data control shown in FIG. 6B is then reported to transmit data control section 15 involved in this change (in this information, the video/voice coding parameter has a value that enables better video/voice to be obtained). In FIG. 6B, the video/voice coding parameter is a parameter used in coding processing and decoding processing, and the transmission/reception format is basic information necessary for transmitting video/voice data to the network.

Here, control operation decision section 125 may also determine that control for changing the image quality and/or sound quality is necessary when the radio field intensity level value improves by 2 or more, for example. Such a change policy may be established by the application, may be built into communication terminal apparatus 10 in advance, or may be set by the user via user setting section 11. According to the change policy in this example, control operation decision section 125 does not change application control even if a change in the radio field intensity from level 2 to level 3 is reported by field intensity determination section 122.

On being informed of the above-described video/voice coding parameter and transmission/reception format, transmit data control section 15 begins transmit data section 18 control using this new control information (ST1600).

Also, when, for example, connection control section 12 is informed from lower layer management section 22 that the network prefix has changed from ID3 to ID4 due to movement of communication terminal apparatus 10, it is determined by network determination section 121 that the network has changed, and as a result of this determination, it is determined by control operation decision section 125 whether or not a change from current data communication is necessary. That is to say, if, for example, the prefix value means that a move has been made to a network with a narrower band than the network prior to the move, control operation decision section 125 determines that it is necessary to change the bandwidth to be reserved. In this case, control operation decision section 125 may store in advance network band widths corresponding to prefix values. The change policy as to the degree of band change for which band reservation should be changed may be established by the application, may be built into communication terminal apparatus 10 in advance, or may be set by the user via user setting section 11.

When control operation decision section 125 determines that a change is necessary, information relating to network control shown in FIG. 6B is reported to network control section 13 involved in this change (in this information, the bandwidth is narrower). In FIG. 6B, the authentication ID is an authentication number necessary for a network move, and bandwidth is the bandwidth that optimizes data transmission.

On being informed of this authentication ID and bandwidth, network control section 13 controls NW information management section 16 using this new control information so that the current bandwidth setting is changed to the new value, and implements a bandwidth reservation change corresponding to the network.

Furthermore, when, for example, connection control section 12 is informed from lower layer management section 22 that the radio link state has changed from UP to DOWN, it is determined by user specification determination section 123 that a change specified by the user has occurred, and as a result of this determination, it is determined by control operation decision section 125 whether or not a change from current data communication is necessary. That is to say, if, for example, upon continuing video/voice communication, a higher-level session layer call is cleared each time the radio link is cut, and it is inconvenient to set up a call again each time the radio link is connected, control is changed so that the session layer call is maintained for a predetermined time after the radio link changes from UP to DOWN. In this case, how long a session is to be maintained after the radio link is cut may be established by the application, may be built into communication terminal apparatus 10 in advance, or may be set by the user via user setting section 11.

When control operation decision section 125 determines that a change is necessary, information relating to signaling control shown in FIG. 6B is reported to signaling control section 14 involved in this change. By this means, signaling section 17 is controlled so that the specified session is maintained for the specified time.

Depending on the kind of change determined to be necessary by control operation decision section 125, notification may be given to a plurality of control sections. For example, if it is necessary to exchange information that decides the type of video/voice or utilization parameters with the communicating party, control operation decision section 125 performs message exchange with the communicating party via signaling section 17 by notifying signaling control section 14 of the connection destination IP address, port number, and session number, together with the new video/voice type and utilization parameters as body information. Control operation decision section 125 also notifies transmit data control section 15 of the new coding parameters and transmission/reception format established by this message exchange.

As described above, when communication terminal apparatus 10 performs data communication by means of an application that employs radio communication, reporting radio environment changes or network environment changes to the application as soon as they are detected enables the application to learn directly of lower layer information that it was not previously able to ascertain, and makes it possible to use that information to provide various seamless services matching user needs.

Cases (1) through (8) below give specific examples of the use of communication terminal apparatus 10 according to this embodiment when performing video communication using an MPEG-4 coding scheme suitable for narrow-band moving image communication called FGS (Fine Granularity Scalability), which offers excellent adaptability to band variations.

Figure 7:
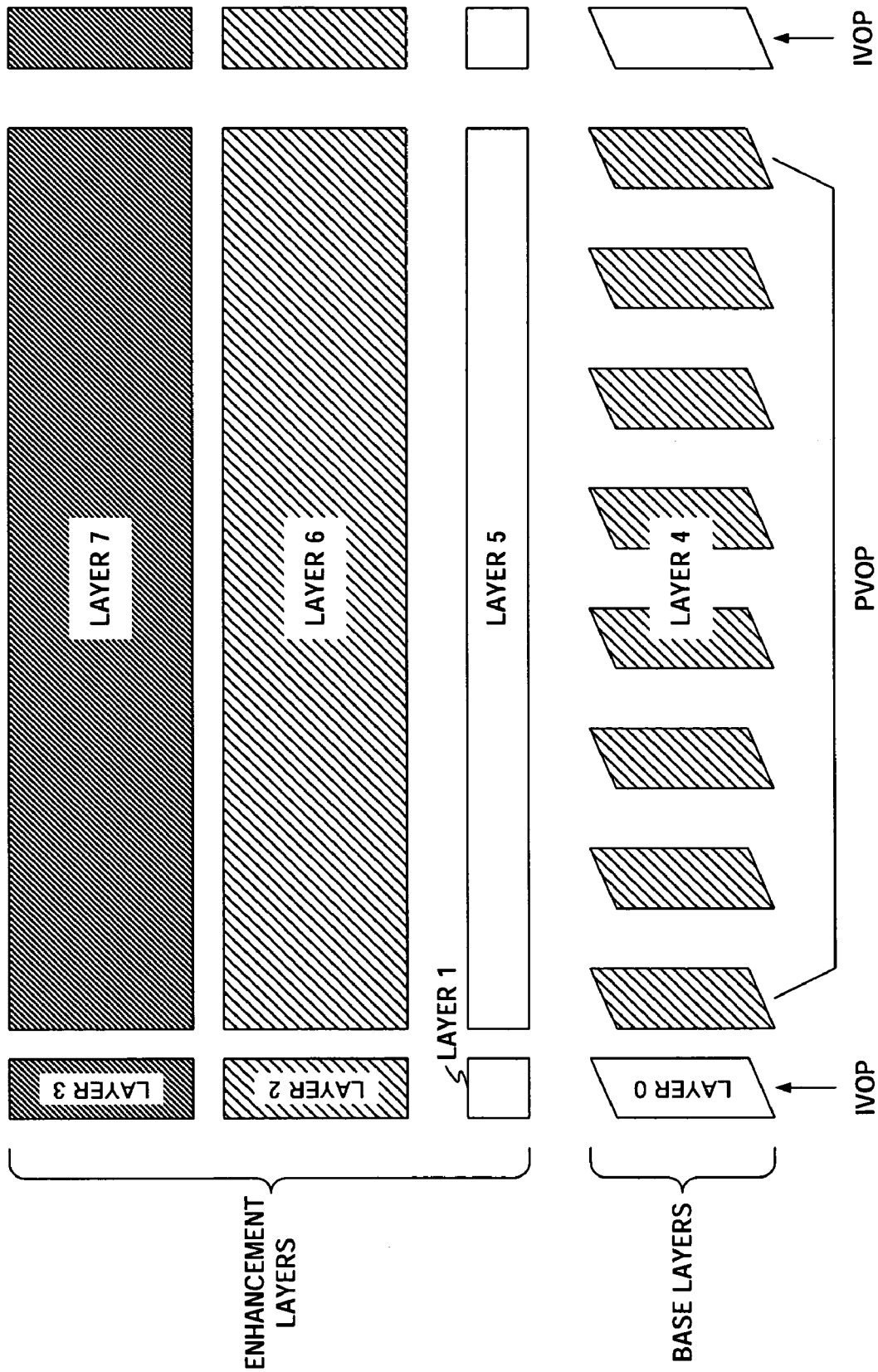
FIG. 7 is a drawing for explaining an MPEG (Moving Picture Experts Group)-4 FGS (Fine Granularity Scalability) moving image.

MPEG-4 FGS, which is specified in the ISO/IEC 14496-2 Amendment 4 Streaming Video Profile, allows smooth image quality adaptation to stepless transmission bands. An FGS moving image is composed of Base Layers and Enhancement Layers, as shown in FIG. 7. The base layers (layers 0 and 4) are generated by ordinary MPEG-4 coding, and provide minimal quality. The enhancement layers (layers 1 through 3 and 5 through 7) are obtained by executing discrete cosine transformation, bit plane transformation, and bit plane variable-length coding on the difference between the source image and the image reconstructed from the base layer, and higher-quality moving images are provided by decoding these layers together with the base layers.

Even if only some of the enhancement layers (such as layers 1 and 5) are used, quality can be improved proportionally, and therefore if an appropriate amount of enhancement layer data is transmitted and received together with the base layers according to the transmission band, higher-quality moving image communication is possible within the available band range. In FIG. 7, layers 0 through 3 are an IVOP (Intra Video Object Plane) coded with only information within a frame, and layers 4 through 7 are a PVOP (Predicted Video Object Plane) prediction-coded using other frame information as well.

A feature of this FGS image is that the image can be coded and transmitted divided into layers, and each layer can be freely selected and played back (decoded) inside the receiving-side terminal. Communication terminal apparatus 10 according to this embodiment can decide which layers to code (transmit) and which layers to receive (decode) according to the communication conditions.

In the following specific examples, an FGS moving image stream is assumed to be multicast-transmitted divided into eight separate layers. In this case, the receiving side can selectively receive and decode only the layers wanted by the terminal.

(1) First, an example will be described in which a field intensity change is detected by receiving-side communication terminal apparatus 10. It is assumed that communication terminal apparatus 10 first receives the entire video stream comprising layers 0 through 7 as a full-quality stream. Here, layers 0 and 4 constitute a partial stream with motion given priority, layers 1 through 3 constitute a partial stream with image quality given priority, and layers 5 through 7 constitute a supplementary stream whose objects are motion priority layers and whose purpose is image quality improvement.

If the radio field intensity, whose maximum and minimum levels are indicated by level 5 and level 0 respectively, falls from level 5 to level 3 while a user is moving while carrying communication terminal apparatus 10, device control section 21 writes the changed current level 3 to the management database of lower layer management section 22 as the field intensity. Triggered by the change in field intensity in the management database from level 5 to level 3, lower layer management section 22 reports "Field intensity level 3" to the application's connection control section 12.

When "Field intensity level 3" is reported to connection control section 12, the fact that the field intensity has changed is detected by field intensity determination section 122, and based on the reported "Field intensity level 3" control operation decision section 125 determines whether or not a transmit data control section 15 change is necessary. In this example, points at which a change is necessary are assumed to be only when the field intensity falls from level 4 or above to level 3 or below, and when the field intensity rises from level 3 or below to level 4 or above. These points are not uniquely fixed, and can be changed freely by the user by means of user setting section 11.

Then, since the field intensity has fallen from level 5 to level 3, control operation decision section 125 determines that it is necessary to change to video reception in which image quality is lowered and priority is given to smoothness of image motion. In this example, the received partial stream is made layers 0 and 4 and layers 1 through 3, and layers 5 through 7 are not received. This received partial stream is not uniquely fixed, and can be changed freely by the user by means of user setting section 11.

Control operation decision section 125 then reports the video/voice coding parameter value within the report information format for transmit data control section 15 as "Layers 0 through 4." On receiving this report, based on "Layers 0 through 4" transmit data control section 15 informs transmit data section 18 that decoding control is to be changed from reception of full-quality layers 0 through 7 to halting of reception of layers 5 through 7, and starts reception and playback of layers 0 through 4.

In the above example, the operation when the field intensity falls from level 5 to level 3 has been considered. When, conversely, the field intensity rises from level 3 to level 5, a change is made so that the reverse of the above-described selection is performed—that is, a change is made from reception of only layers 0 through 4 to reception of full-quality layers 0 through 7.

It is also possible for transmit data control section 15 changes to be carried out with greater precision. For example, it is possible to halt reception of layer 7 from among the eight layers when the field intensity falls to level 4, to halt reception of layers 5 through 7 when the field intensity falls to layer 3, to receive only layers 0 and 4 and layers 1 and 2 when the field intensity falls to level 2, and to receive only layers 0 and 4 when the field intensity falls to level 1.

Also, an example has been described in which the received field intensity is that of a radio wave received from a single radio access point or a single radio base station, but changes in field intensity may also be detected for received radio waves from a plurality of radio access points or radio base stations using software radio or diversity control.

In the above description an example has been given in which, when a field intensity change is detected by a receiving-side communication terminal apparatus, the layers received by that terminal within the transmitted video stream are changed, but it is also possible for the layers contained in a video stream coded and transmitted by the transmitting-side communication terminal apparatus to be changed when a change in field intensity is detected by that terminal.

By thus having a change in the field intensity, which is one component of the radio environment, conveyed directly to the application, and having the application's connection control section 12 re-set a video or voice parameter appropriate to the radio environment on each such occasion according to the user's needs, it is possible to construct an application capable of providing a service that meets the user's wishes.

(2) Next, an example will be described in which a change in the radio link connection/disconnection state is detected by a receiving-side communication terminal apparatus. If the radio link changes from the UP state to the DOWN state while a user is moving while carrying communication terminal apparatus 10, device control section 21 writes a changed current DOWN flag "0" (where UP is indicated by a "1" flag and DOWN by a "0" flag) to the management database of lower layer management section 22 as the radio link state. Triggered by the change in the radio link in the management database from "1" to "0," lower layer management section 22 reports "Radio link flag 0" to the application's connection control section 12.

When the radio link is cut, data is no longer received, and therefore heretofore a video communication session has been aborted, but in this embodiment, the fact that the radio link has been cut is detected by user specification determination section 123 as specified beforehand by the user, and based on the reported "Radio link flag 0" control operation decision section 125 determines whether or not it is necessary to maintain the session for a fixed time instead of terminating the session. In this example, the point for which maintenance is necessary is assumed to be always maintaining the link for a fixed time (for example, 5 seconds). This point and the maintenance time are not uniquely fixed, and can be changed freely by the user by means of user setting section 11.

Then, having determined that session maintenance is necessary, control operation decision section 125 waits until "Radio link flag 1" is reported. If "Radio link flag 1" is reported from user specification determination section 123 within the session maintenance time, the session is continued as-is. On the other hand, if "Radio link flag 1" has not been reported when the session maintenance time elapses, the video communication session is terminated.

In the above description an example has been given in which, when a change in the radio link state is detected by a receiving-side communication terminal apparatus, the video stream session is maintained for a predetermined time as necessary, but it is also possible for control to be performed so that the session is not cut off for a predetermined time as necessary when a change in the radio link state is detected by the transmitting-side radio communication apparatus.

By thus having link severance, which is one component of the radio environment, conveyed directly to the application, and having the application's connection control section 12 maintain the session according to the user's needs, it is possible to construct an application capable of flexibly continuing a service in which the session has heretofore been aborted when the radio link was cut.

(3) Next, an example will be described in which a change in the radio modulation scheme is detected by a receiving-side communication terminal apparatus. It is assumed here that, for example, CCK (Complementary Code Keying), which is a radio access point modulation scheme, is indicated by flag 1, and QPSK (Quadrature Phase Shift Keying), which is a radio base station modulation scheme, is indicated by flag 2.

It is assumed that handover is performed from a radio access point to a radio base station when a video stream comprising all of layers 0 through 7 in FIG. 7 is being received while a user is moving while carrying communication terminal apparatus 10. On detecting that the radio modulation scheme has changed from CCK to QPSK, device control section 21 writes a changed current QPSK flag "2" to the management database of lower layer management section 22 as the modulation scheme. Triggered by the change in the modulation scheme in the management database from "1" to "2," lower layer management section 22 reports "Modulation scheme flag 2" to the application's connection control section 12.

When "Modulation scheme flag 2" is reported to connection control section 12, the fact that the modulation scheme has changed is detected by modulation scheme determination section 124, and based on the reported "Modulation scheme flag 2" control operation decision section 125 determines whether or not a transmit data control section 15 change is necessary. In this example, the point at which a change is necessary is assumed to be only when a change is made from a flag indicating a radio access point to a flag indicating a radio base station. That is to say, it is assumed that a change is determined to be unnecessary in the case of movement from a radio access point to a radio access point using a different modulation scheme, or in the case of movement from a radio base station to a radio base station using a different modulation scheme. This point is not uniquely fixed, and can be changed freely by the user by means of user setting section 11.

Then, as it is possible to secure a wider band with a radio wave from a radio access point than with a radio wave from a radio base station, since the modulation scheme has fallen from flag 1 to flag 2, control operation decision section 125 determines that it is necessary to change to video reception in which image quality is lowered and priority is given to motion. In this example, reception of layers 5 through 7 is halted, and only layers 0 through 4 are received. Which layers are received is not uniquely fixed, and can be changed freely by the user by means of user setting section 11.

In the above example, the operation when the modulation scheme changes from flag 1 to flag 2 has been considered. When the modulation scheme changes from flag 2 to flag 1, a change is made so that the reverse of the above-described selection is performed—that is, a change is made from reception of only layers 0 through 4 to reception of full-quality layers 0 through 7.

In the above description an example has been given in which, when a change in the radio modulation scheme is detected by a receiving-side communication terminal apparatus, the layers received by that terminal within the transmitted video stream are changed, but it is also possible for the layers contained in a video stream coded and transmitted by the transmitting-side communication terminal apparatus to be changed when a change in the modulation scheme is detected by that terminal.

By thus having a change in the modulation scheme, which is one component of the radio environment, conveyed directly to the application, and having the application's connection control section 12 re-set a video or voice parameter appropriate to the radio environment on each such occasion according to the user's needs, it is possible to construct an application capable of providing a service that meets the user's wishes.

(4) Next, an example will be described in which a change in the radio access point congestion state is detected by a receiving-side communication terminal apparatus. It is assumed that, while a user is performing communication in which communication terminal apparatus 10 is connected to a particular radio access point and receives a video stream comprising all of layers 0 through 7, the number of users of that radio access point increases due to use by another user, and only a smaller band can be secured.

On detecting that the access point congestion state (number of users), whose maximum and minimum levels are indicated by level 5 and level 0 respectively, has changed from level 1 to level 3, device control section 21 writes the changed current level 3 to the management database of lower layer management section 22 as the congestion state. Triggered by the change in the congestion state in the management database from level 1 to level 3, lower layer management section 22 reports "Congestion state level 3" to the application's connection control section 12.

When "Congestion state level 3" is reported to connection control section 12, the fact that the congestion state has changed is detected by network determination section 121, and based on the reported "Congestion state level 3" control operation decision section 125 determines whether or not a transmit data control section 15 change is necessary, and if necessary, reports the new video/voice coding parameter value to transmit data control section 15. In this example, the points at which a change is necessary and the change methods for those points are assumed to be as follows: not receiving video stream layers 5 through 7 when the congestion state falls to level 3, receiving only layers 0 and 4 when the congestion state falls to level 5, and, conversely, receiving layers 0 through 4 when the congestion state rises to level 4, and performing full-quality (layer 0 through 7) reception when the congestion state rises to level 2. These points and received layers are not uniquely fixed, and can be changed freely by the user by means of user setting section 11.

In the above example, the congestion state of a radio access point has been considered, but control changes according to the congestion state can also be made in the same way for a radio base station. Also, the above description relates to an example in which the congestion state changes during connection to the same radio access point, but control can also be altered in the same way in the event of a change in the congestion state when the connected radio access point changes due to movement of the user.

In the above description an example has been given in which, when a change in the radio congestion state is detected by a receiving-side communication terminal apparatus, the video stream layers received by that terminal are changed, but it is also possible for the video stream layers coded and transmitted by the transmitting-side communication terminal apparatus to be changed when a change in the congestion state is detected by that terminal.

By thus having a change in the congestion state, which is one component of the radio environment, conveyed directly to the application, and having the application's connection control section 12 re-set a video or voice parameter appropriate to the radio environment on each such occasion according to the user's needs, it is possible to construct an application capable of providing a service that meets the user's wishes.

(5) Next, an example will be described in which a change in the network prefix is detected by a receiving-side communication terminal apparatus. It is assumed that, while communication terminal apparatus 10 is receiving a video stream comprising all of layers 0 through 7, communication terminal apparatus 10 moves from a network whose IP address is represented as aaa.bbb.xx.xx to a network whose IP address is represented as aaa.ccc.xx.xx. It is also assumed that the aaa.ccc.xx.xx network has a lower transmission band than the aaa.bbb.xx.xx network, and that information as to this transmission band difference being of a degree necessitating a control change is stored in communication terminal apparatus 10 beforehand.

The network to which communication terminal apparatus 10 is connected writes the prefix of that network to an area referenced by network distribution control section 20 within data transmitted and received. Network distribution control section 20 references this data area, and on detecting that a change has occurred in the above-described network prefix, writes the changed current network aaa.ccc.xx.xx to the management database of lower layer management section 22 as the prefix. Triggered by the change in the prefix in the management database from aaa.bbb.xx.xx to aaa.ccc.xx.xx, lower layer management section 22 reports "Network aaa.ccc.xx.xx" to the application's connection control section 12.

When "Network aaa.ccc.xx.xx" is reported to connection control section 12, the fact that the network has changed is detected by network determination section 121, and based on the reported "Network aaa.ccc.xx.xx" control operation decision section 125 determines whether or not a transmit data control section 15 change is necessary. A point at which a change is necessary and the change method for that point are not uniquely fixed, and can be changed freely by the user by means of user setting section 11.

Then, since the prefix has changed from aaa.bbb.xx.xx to aaa.ccc.xx.xx, control operation decision section 125 determines that it is necessary to change to video reception in which image quality is lowered and priority is given to motion. Control operation decision section 125 reports the video/voice coding parameter value to transmit data control section 15 as "Layers 0 through 4," halts reception of layers 5 through 7, and starts playback based on received layers 0 through 4.

In the above example, a change of prefix from network aaa.bbb.xx.xx to aaa.ccc.xx.xx has been considered. When the prefix changes from aaa.ccc.xx.xx to aaa.bbb.xx.xx, the reverse of the above-described selection is performed.

In the above description an example has been given in which, when a prefix change (receiving-side domain change) is detected by a receiving-side communication terminal apparatus, the video stream layers received by that terminal are changed, but it is also possible for the video stream layers coded and transmitted by the transmitting-side communication terminal apparatus to be changed when a prefix change (receiving-side domain change) is detected by that terminal.

By thus having a change of prefix, which is one component of the network environment, conveyed directly to the application, and having the application's connection control section 12 re-set a video or voice parameter appropriate to the network environment on each such occasion according to the user's needs, it is possible to construct an application capable of providing seamless service.

(6) Next, another example will be described in which a change in the network prefix is detected by a receiving-side communication terminal apparatus. It is assumed that a prefix change occurs in the same way as described above, and that the band of pre-movement network aaa.ddd.xx.xx is 50 Mbps, and the band of post-movement network aaa.eee.xx.xx band is 100 Mbps. These items of network band information are assumed to be stored in communication terminal apparatus 10 beforehand. Writing of the prefix change to the management database of lower layer management section 22, and reporting of "Network aaa.eee.xx.xx" to the application's connection control section 12 by lower layer management section 22, are performed in the same way as in example (5) above.

When "Network aaa.eee.xx.xx" is reported to connection control section 12, the fact that the network has changed is detected by network determination section 121, and based on the reported "Network aaa.eee.xx.xx" control operation decision section 125 determines whether or not a transmit data control section 15 change is necessary from the band reservation necessary for current video transmission/reception (assumed to be 70 Mbps). In this example, as a point at which a change is necessary and the change method for that point, it is determined to be necessary to change the band reservation from 70 Mbps to 120 Mbps when a change is made from aaa.ddd.xx.xx (50 Mbps band) to aaa.eee.xx.xx (100 Mbps band). This point and the method of deciding on the band to be reserved are not uniquely fixed, and can be changed freely by the user by means of user setting section 11.

Then, on determining that a band reservation change is necessary, control operation decision section 125 sets "120 Mbps" as the bandwidth and "Local terminal ID" necessary for band reservation as the authentication ID within the report information format for network control section 13 (see FIG. 6B), and makes a report. On receiving this report, network control section 13 makes preparations for performing band reservation based on "120 Mbps" and "Local terminal ID," informs NW information management section 16 that band reservation is to be made, and secures a 120 Mbps band.

In the above example, a change of prefix from network aaa.ddd.xx.xx to aaa.eee.xx.xx has been considered. When the prefix changes from aaa.eee.xx.xx to aaa.ddd.xx.xx, the reverse of the above-described band setting is performed.

In the above description an example has been given in which, when a prefix change is detected by a receiving-side communication terminal apparatus, band reservation is changed in line with the receiving-side domain, but it is also possible for band reservation to be changed in line with the transmitting-side domain when a prefix change is detected by the transmitting-side communication terminal apparatus. Also, in the case of an application for which end-to-end band securement is desirable, message exchange may be carried out between the transmitting side and receiving side, and the band decided on as a result reserved.

In the above example, the band reservation value is determined according to the size of the band of each network, but it is also possible to decide on the band reservation value by means of billing information of each network or the like. That is to say, when communication terminal apparatus 10 detects that it has moved to a network with high charges, for example, band reservation is lowered and billing curbed. This kind of band reservation policy should preferably be settable by the user.

By thus having a change of prefix, which is one component of the network environment, conveyed directly to the application, and having the application's connection control section 12 re-set the band necessary for video communication in accordance with the network environment on each such occasion according to the user's needs, it is possible to construct an application capable of providing service appropriate to the network used.

In above examples (5) and (6), IPv4 IP addresses are used, but network prefix changes can also be detected and application control changed in a similar way in the case of IPv6 networks.

(7) Next, an example will be described in which a change in the receive buffer size is detected by a receiving-side communication terminal apparatus. It is assumed that, while communication terminal apparatus 10 is receiving a video stream comprising all of layers 0 through 7, the receive buffer size changes from the current 1024 KB to 512 KB due to movement of at least one of the local terminal and/or far-end terminal to a different network. The larger the receive buffer size value, the greater is the amount of video data that can be received at one time.

Network distribution control section 20 monitors the receive buffer size, and when a change occurs, writes the changed current 512 KB to the management database of lower layer management section 22 as the receive buffer size. Triggered by the change in the receive buffer size in the management database from 1024 KB to 512 KB, lower layer management section 22 reports "Receive buffer size 512 KB" to the application's connection control section 12.

When "Receive buffer size 512 KB" is reported to connection control section 12, the fact that the receive buffer size has changed is detected by network determination section 121, and based on the reported "Receive buffer size 512 KB" control operation decision section 125 determines whether or not a transmit data control section 15 change is necessary. In this example, as a point at which a change is necessary and the change method for that point, it is determined to be necessary to change to video reception in which image quality is lowered and priority is given to motion by halting reception of layers 5 through 7 when the receive buffer size falls to 700 KB or less. This point and the selection of layers to be received are not uniquely fixed, and can be changed freely by the user by means of user setting section 11.

Then, since the receive buffer size has changed from 1024 KB to 512 KB (less than 700 KB), control operation decision section 125 reports the video/voice coding parameter value to transmit data control section 15 as "Layers 0 through 4," and has transmit data section 18 receive layers 0 through 4 and start playback.

In the above example, a change in the receive buffer size from 1024 KB to 512 KB has been considered. When the prefix changes from 512 KB to 1024 KB, the reverse of the above-described selection is performed.

In the above description an example has been given in which, when a change in the receive buffer size is detected by a receiving-side communication terminal apparatus, the video stream layers received by that terminal are changed, but it is also possible for the video stream layers coded and transmitted by the transmitting-side communication terminal apparatus to be changed when a change in the receive buffer size is detected by that terminal.

By thus having a change in the receive buffer size, which is one component of the network environment, conveyed directly to the application, and having the application's connection control section 12 re-set a video or voice parameter appropriate to the network environment on each such occasion according to the user's needs, it is possible to construct an application capable of providing seamless service.

(8) Lastly, an example will be described in which a change in the number of retransmissions is detected. It is assumed that the number of retransmissions changes from the current 0 to 3 when a video stream comprising all of layers 0 through 7 in FIG. 7 is being received while a user is moving while carrying communication terminal apparatus 10. A larger number-of-retransmissions value indicates a proportional failure of image data to reach the far-end party correctly, and is a cause of delay when playing back video.

On detecting a change in the number of retransmissions, network distribution control section 20 writes the changed current value of 3 to the management database of lower layer management section 22 as the number of retransmissions. Triggered by the change in the number of retransmissions in the management database from 0 to 3, lower layer management section 22 reports "Number of retransmissions 3" to the application's connection control section 12.

When "Number of retransmissions 3" is reported to connection control section 12, the fact that the number of retransmissions has changed is detected by network determination section 121, and based on the reported "Number of retransmissions 3" control operation decision section 125 determines whether or not a transmit data control section 15 change is necessary. In this example, as a point at which a change is necessary and the change method for that point, it is determined to be necessary to change to video transmission in which image quality is lowered and priority is given to motion by halting coding of layers 5 through 7 when the number of retransmissions increases to 3 or more. This point and the selection of layers to be transmitted are not uniquely fixed, and can be changed freely by the user by means of user setting section 11.

Then, since the number of retransmissions has changed from 0 to 3, control operation decision section 125 determines that a change in the layers transmitted is necessary, and reports the video/voice coding parameter value within the report information format for transmit data control section 15 (see FIG. 6B) as "Layers 0 through 4." On receiving this report, based on "Layers 0 through 4" transmit data control section 15 informs transmit data section 18 that coding control is to be changed from transmission of full-quality layers 0 through 7 to halting of transmission of layers 5 through 7, and starts coding and transmission of layers 0 through 4.

When communication terminal apparatus 10 is transmitting a video stream to a plurality of far-end terminals, the number of retransmissions may differ according to the far-end terminal. In this case, transmission may be performed with all of layers 0 through 7 coded, for example, as appropriate for the far-end terminal with the smallest number of retransmissions, and with some layers selected from the coded layers for far-end terminals with a larger number of retransmissions for which the amount of data should be reduced.

In the above example, a change in the number of retransmissions changes from 0 to 3 has been considered. When the number of retransmissions changes from 3 to 0, the reverse of the above-described change is made in the layers to be coded and transmitted.

By thus having a change in the number of retransmissions, which is one component of the network environment, conveyed directly to the application, and having the application's connection control section 12 re-set a video or voice parameter appropriate to the network environment on each such occasion according to the user's needs, it is possible to construct an application capable of providing seamless service.

In above examples (1) through (8), changing control by focusing on one item within the radio environment or network environment has been described, but the necessity of a control change may also be determined based on changes in a plurality of items. That is to say, if, for example, a change of network prefix indicates that the terminal has moved into a domain with a small area, but the receive buffer size has not decreased very much, control operation decision section 125 may determine that it is not necessary to carry out a change that will lower image quality. Similarly, control operation decision section 125 may determine that it is not necessary to carry out a change that will lower image quality if the radio field intensity has fallen to a predetermined level or below but the access point congestion state has not deteriorated. It is desirable for precise criteria of this kind to be settable and modifiable via user setting section 11 in order to reflect the user's wishes.

Also, in above examples (1) through (8) the descriptions are based on MPEG-4 FGS, which allows control of the amount of data coded and transmitted on the transmitting side, and control of the amount of data received and decoded on the receiving-side, to be performed independently, but other video/voice coding schemes may of course also be used. For example, it is possible to change the MPEG-4 simultaneous profile frame (an example of a coding parameter change), or to change from MPEG-4 to MPEG-7 (an example of a coding scheme change), based on a change in the communication environment detected in a lower layer.

In this case, for example, when the transmitting side detects that the network band has narrowed, or detects that speed is constrained by an increase in the number of users, it can switch to a coding scheme that lowers image quality and/or sound quality and reduces the amount of data sent to the communicating party.

Also, instead of making a change that lowers image quality and/or sound quality, it is possible to switch to a coding scheme that includes greater error tolerance control. Carrying out this kind of switchover on the transmitting side when a fall in the radio field intensity or an increase in the number of retransmissions is detected, in particular, enables the receiving-side terminal to perform pseudo-playback of video/voice based on data on which error tolerance control has been executed.

When the transmitting-side coding scheme is changed in accordance with changes in the communication conditions as described above, transmitting-side communication conditions can be detected by the transmitting-side communication terminal apparatus, enabling control changes to be made within the transmitting-side communication terminal apparatus (although, in the case of a change of coding scheme, the change may be made after an exchange of messages with the receiving side), but receiving-side communication conditions cannot be detected directly by the transmitting-side communication terminal apparatus. Thus, as described in detail later herein, when the receiving-side communication terminal apparatus detects a change in the receiving-side radio environment or network environment, it changes the transmitting-side coding scheme by sending a signaling message to the transmitting-side communication terminal apparatus. This signaling message may include information concerning the coding scheme after a change (whether or not a change of coding scheme is necessary being determined by the receiving-side communication terminal apparatus based on a change in the receiving-side communication conditions), or may include information directly indicating the receiving-side communication conditions (whether or not a change of coding scheme is necessary being determined by the transmitting-side communication terminal apparatus based on a change in the receiving-side communication conditions).

Furthermore, in above examples (1) through (8), control operation decision section 125 determines whether or not it is necessary to change application control each time a radio environment or network environment item changes, but it is also possible to have this determination made by the user. That is to say, when, for example, it is detected that the radio field intensity has deteriorated, control operation decision section 125 asks the user via user setting section 11 whether or not control of control sections 13 through 15 is to be changed (and may also have the user select the kind of change to be made), and changes control in accordance with the user's instructions. It is also possible for points about which the user is to be asked to be set beforehand in control operation decision section 125 (these settings can also be made via user setting section 11) instead of asking the user about all changes, and for transmit output signal 25 to perform determination concerning communication condition changes not covered by these set points.

Even when control operation decision section 125 performs determination, the criteria can still be set by the user via user setting section 11. Set criteria can also easily be changed via user setting section 11. For example, if a user setting made when an application is started up stipulates that a change is to be made from video stream full-quality (layer 0 through 7) reception to selection and reception of layers 0 through 4 only when the field intensity changes from level 5 to level 3 (with no change being made for other radio environment changes), when "Field intensity level 3" is reported from lower layer management section 22 to device control section 21, whether or not the condition set by the user at the time of startup has been matched is determined by user specification determination section 123. In this example only one condition is set for making a change, but a plurality of conditions may be set simultaneously.

Embodiment 2

In Embodiment 1, examples were described in which, when connection control section 12 determines that it is necessary to change the service generation environment of an application based on information reported from lower layer management section 22, the change is carried out within that terminal. In Embodiment 2, on the other hand, a case will be described in which negotiation is conducted with the communicating party. In this negotiation the local terminal may request the agreement of the far-end terminal concerning a change proposed by the local terminal in order for the agreed-to change to be executed by the local terminal, or in order for a change proposed by the local terminal to be executed by the far-end terminal, or in order for the conditions of the local terminal to be reported to the far-end terminal and to have the far-end terminal propose a change.

As the overall configuration of a communication terminal apparatus of this embodiment is similar to the overall configuration of communication terminal apparatus 10 according to Embodiment 1 (FIG. 2), a description thereof will be omitted here. In this embodiment, the detailed configuration of connection control section 12 is the only point of difference from Embodiment 1.

Figure 8:
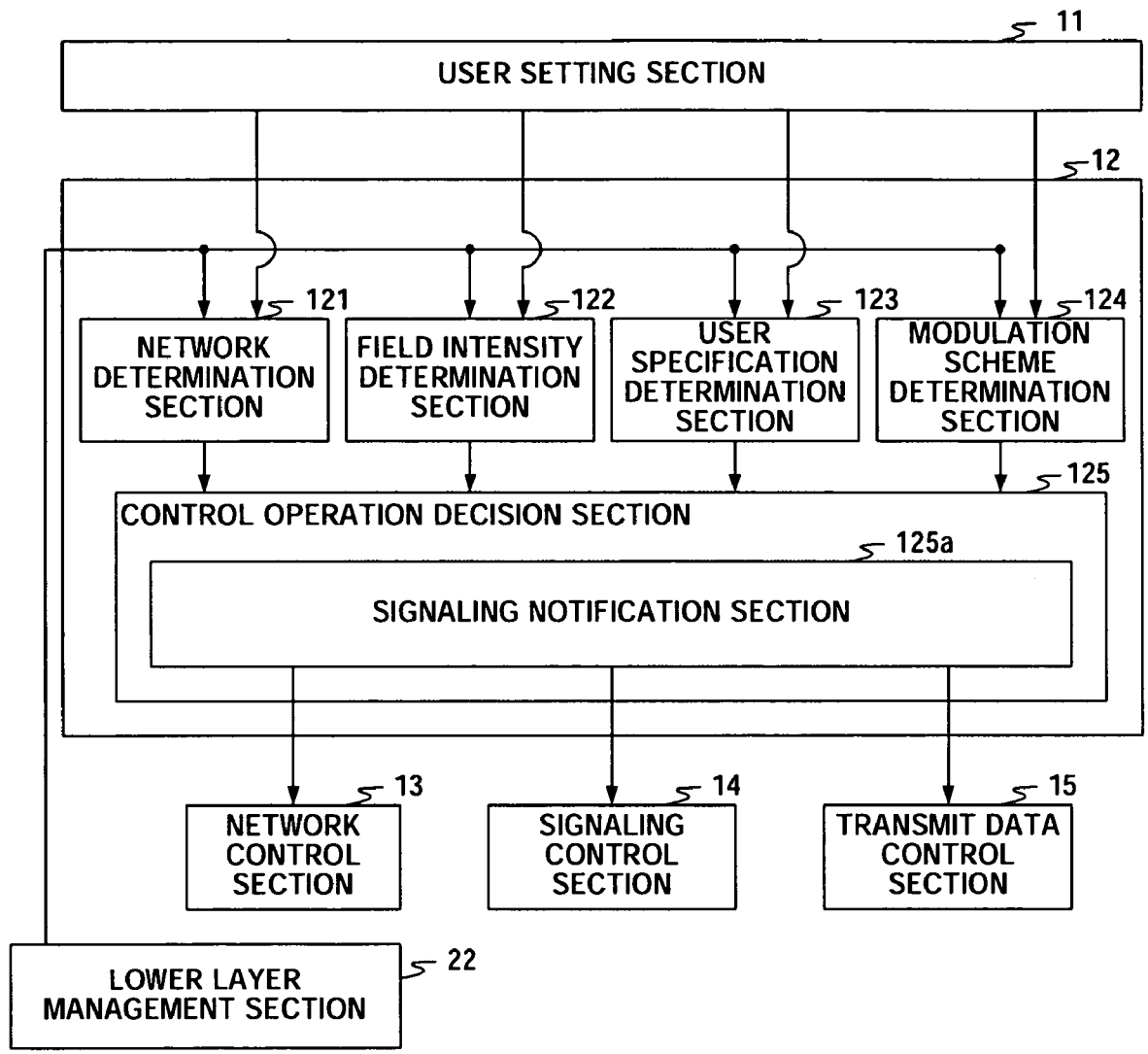
FIG. 8 is a block diagram showing the detailed configuration of a connection control section according to Embodiment 2 of the present invention.

FIG. 8 is a block diagram showing the detailed configuration of connection control section 12 according to Embodiment 2. Parts in FIG. 8 identical to those in FIG. 3 are assigned the same codes as in FIG. 3 and descriptions thereof are omitted. As shown in FIG. 8, this embodiment differs from Embodiment 1 in that control operation decision section 125 in connection control section 12 includes a signaling notification section 125a.

When negation with the communicating party becomes necessary as a result of determination by any of the four determination sections 121 through 124, signaling notification section 125a notifies signaling control section 14 that updating of a call involving the communication terminal is to be started.

The operation of a communication terminal apparatus according to this embodiment will now be described with reference to the flowchart shown in FIG. 9.

A communication terminal apparatus according to this embodiment operates in the same way as in FIG. 5 up to reception by connection control section 12 of notification from lower layer management section 22. That is to say, on detecting a change in the radio environment during movement or the like, device control section 21 notifies lower layer management section 22, and lower layer management section 22 writes that change to the management database. Then, each time a change is written to the management database, the changed information is reported to connection control section 12 (ST2000). Similarly, if network distribution control section 20 detects a change in the network environment during movement or the like, the changed information is reported to connection control section 12 (ST2000).

Information relating to a change in a management database item is reported to control operation decision section 125 by determination sections 121 through 124. On receiving this report, control operation decision section 125 determines whether or not negotiation with the communicating party is necessary based on the reported information (ST2100). For example, negotiation is necessary if a method other than the video/voice coding/decoding scheme currently being used has to be selected (such as when image disturbance occurs with the current video coding/decoding scheme due to deterioration of the radio field intensity), or if the local terminal does not have the authority to decide on an application control change.

If it is determined that negotiation is necessary, signaling notification section 125a in control operation decision section 125 uses the communication information format for signaling control shown in FIG. 6B to notify signaling control section 14 that updating of a call involving the communicating party is to be started (ST2400). The information reported to signaling control section 14 includes the connection destination IP, port number, and session number, together with body information in which is written the far-end terminal, type of video/voice, and candidate information for re-determining the utilization parameters, for example. Signaling notification section 125a can also write information indicating lower layer communication conditions reports by lower layer management section 22 in the body information.

On receiving this notification, signaling control section 14 changes the call status, and performs call updating via signaling section 17. Then, as a result of this signaling, it is determined by control operation decision section 125 whether or not a change in control is necessary in network control section 13 or transmit data control section 15 (ST2500), and if a change is necessary, control using the new control information is started by the relevant control section (ST2300).

If the result of the determination in ST2100 is that negation with the communicating party is not necessary, it is determined whether or not a control change is necessary within the local terminal (ST2200), and if a control change is necessary for any of control sections 13 through 15, the changed control information is reported to the relevant control section. The control section that has received this notification then begins control based on that information (ST2300).

The processing procedure flow is not limited to the above-described example, and a processing procedure is also possible, for example, in which control operation decision section 125, after being notified of a lower layer information change, first determines the necessity of changing control information in control sections 13 through 15, and then determines whether or not negotiation with the communicating party is necessary in order to implement the change determined to be necessary.

In this way, if a change in the communication conditions is detected in a lower layer after a communication session has been established, it is possible to conduct negotiations with the communicating party again and change session information while maintaining that session, making it possible always to perform video/voice communication by means of a session appropriate to the communication conditions.

A specific example is given below of the use of a communication terminal apparatus according to this embodiment when using a signaling protocol known as SIP (Session Initiation Protocol) for starting, managing, and terminating a voice or video session on a packet network.

SIP is text-based signaling in the application layer by means of which a session is set up between application layers.

Figure 10B:
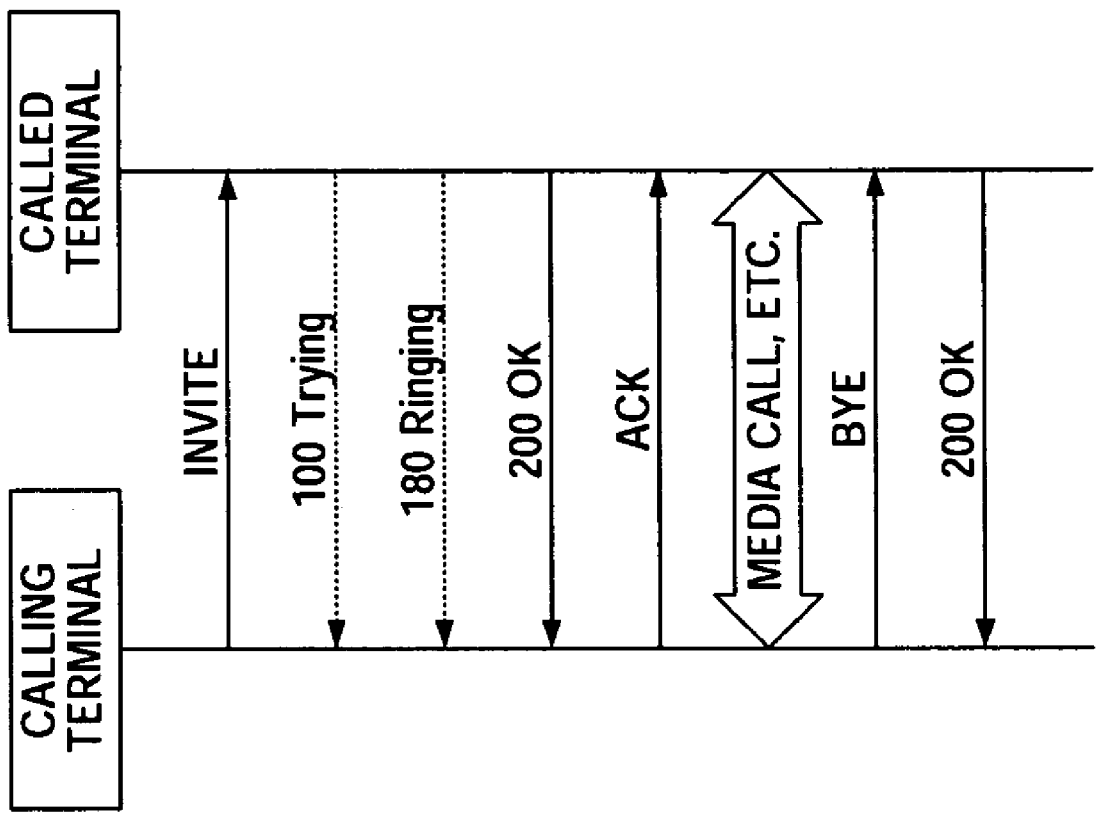
FIG. 10B is a drawing explaining the SIP communication session establishment procedure.
Figure 10A:
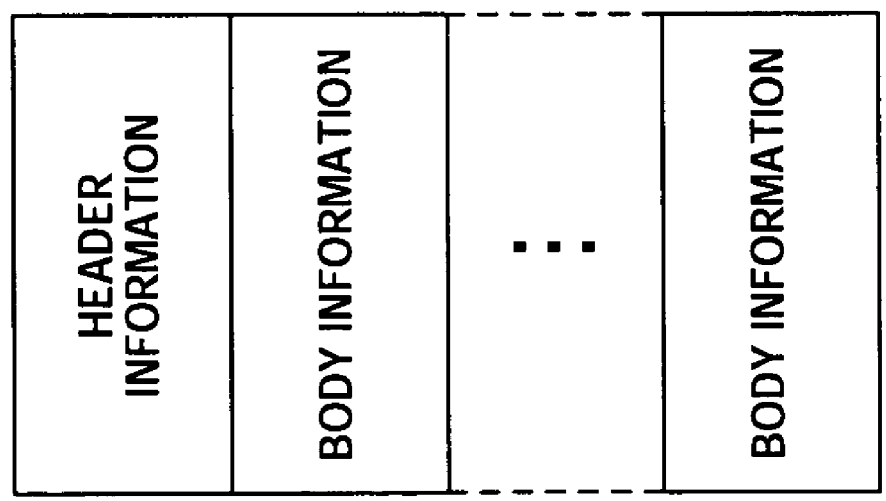
FIG. 10A is a drawing explaining the SIP (Session Initiation Protocol) message format.

SIP is stipulated in IETF RFC3261, and has a message format comprising header information and body information as shown in FIG. 10A. The SDP (Session Description Protocol) stipulated in RFC2327, for example, can be used as body information, and new body information can be defined and added to the header information.

FIG. 10B shows the connection sequence when communication terminal apparatuses perform MPEG4-FGS video communication (a kind of media call), for example, by means of SIP. The calling terminal adds SDP describing MPEG4-FGS setup to the body information, and issues an SIP message INVITE. On receiving INVITE, the called terminal, when enabling communication based on the SDP contained in INVITE, transmits response 200 OK to the calling terminal. 100 Trying and 180 Ringing are provisional responses indicating that processing is in progress. On receiving 200 OK from the called terminal, the calling terminal finally returns call establishment response ACK to the called terminal, a communication session is established, and MPEG4-FGS video communication begins.

According to the above-described SIP, voice and video parameters can be decided upon by means of signaling, but with a communication terminal apparatus of this embodiment, the timing for issuing signaling can be determined in accordance with communication conditions. Also, with a communication terminal apparatus of this embodiment, lower layer information of the terminal (such as the terminal's radio field intensity and currently used bandwidth) can be added as body information, and reported to connection control section 12 of the far-end terminal's application.

An example of a case where negotiation is conducted with the communicating party is when the communicating party is a conventional communication terminal apparatus and does not have a lower layer management section.

Figure 9:
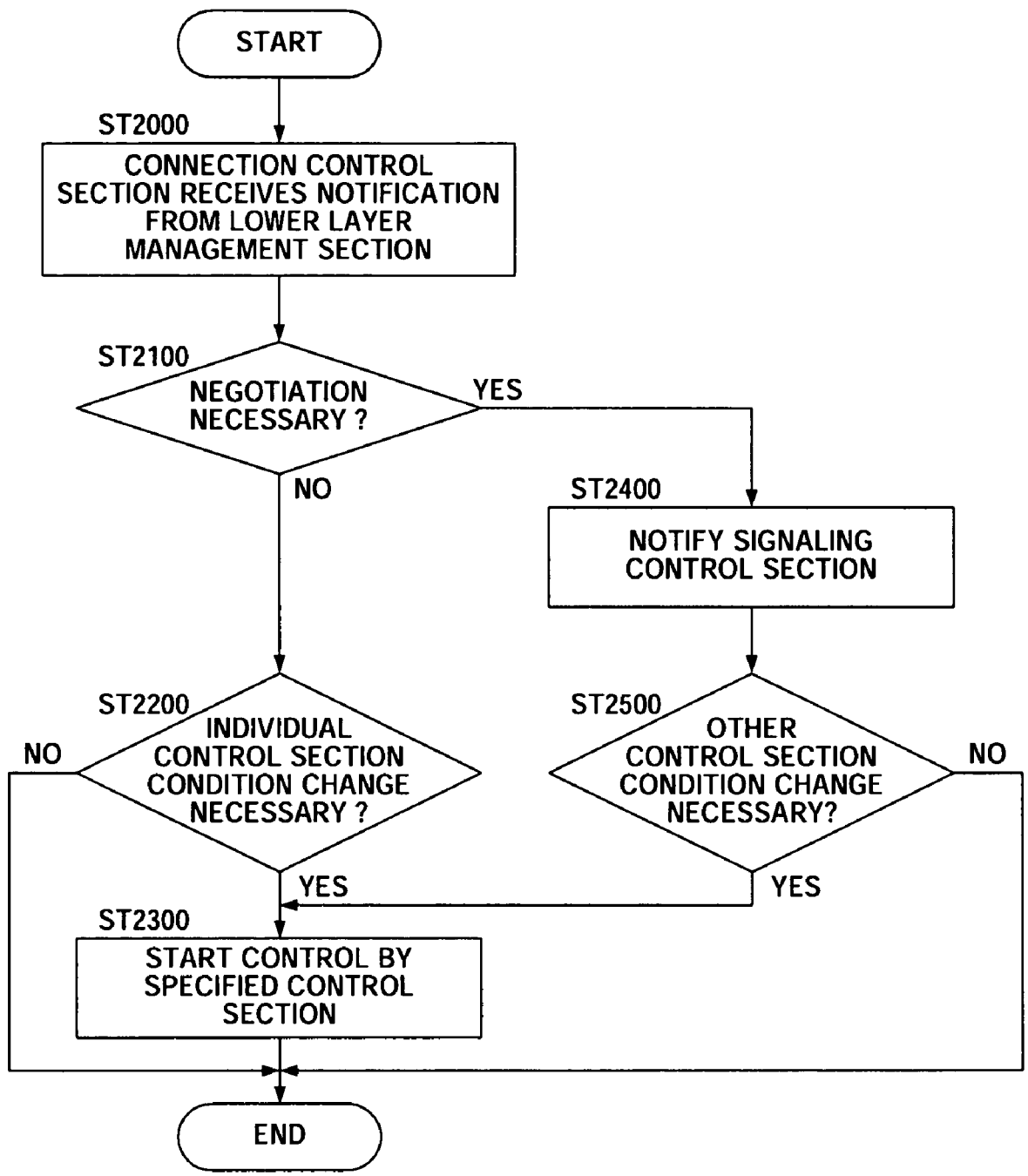
FIG. 9 is a flowchart showing an example of the processing of a communication terminal apparatus according to Embodiment 2.

In this case, lower layer management section 22 of the local terminal reports the radio environment and network environment in the local terminal's network to connection control section 12, and connection control section 12 causes signaling control section 14 of the local terminal to start signaling in accordance with the flowchart in FIG. 9. A message provided by this signaling reaches the signaling control section of the far-end terminal, and the signaling body information is shared between connection control section 12 and the connection control section of the far-end terminal. This body information may be a new video/voice type or utilization parameters proposed by connection control section 12, or may be lower layer information (such as the radio field intensity received by the local terminal) reported by connection control section 12 from lower layer management section 22. The connection control section of the far-end terminal performs a change of control information of each control section using the proposed parameters, etc., in the former case, or, in the latter case, determines whether a change of control is necessary in each control section based on the reported lower layer information.

As described in detail above, in the above-described embodiments, a lower layer management section is newly introduced that reports lower layer information to an upper layer, and the connection control section that provides an application's service generation environment recognizes lower layer information directly. By this means, various kinds of status determination and control changes based on lower layer information are made possible at the application level, and a video/voice communication service that the user feels to be clearly visible and audible can continue to be provided, as far as possible, even if communication conditions change in a mobile environment.

Three communication modes are possible: (i) when both the video/voice stream transmitting side and receiving side are mobile communication terminal apparatuses; (ii) when the transmitting side is a mobile communication terminal apparatus and the receiving side is a fixedly connected communication terminal apparatus; and (iii) when the transmitting side is a fixedly connected communication terminal apparatus and the receiving side is a mobile communication terminal apparatus. In cases (i) and (ii), if lower layer management section 22 according to these embodiments is introduced into the transmitting-side communication terminal apparatus, control adapted to the transmitting-side radio network lower layer conditions can be performed at the application level. In cases (i) and (iii), if lower layer management section 22 according to these embodiments is introduced into the receiving-side communication terminal apparatus, control adapted to the receiving-side radio network lower layer conditions can be performed at the application level.

Although the above-described effect is greater when lower layer management section 22 shown in FIG. 2 is installed in a mobile terminal, a predetermined effect is also obtained when a lower layer management section is installed in a fixed terminal such as a content distribution server. An example of this will now be described.

The content distribution server (communication terminal apparatus 10) in this example monitors radio network congestion information and so forth based on information transmitted directly from a lower layer, and can perform transmission control in line with the currently used communication environment. Even in a case where a conventional type of mobile terminal with no lower layer management section receives video/voice content distribution from the content distribution server in this example, it is possible for the user to receive communication that has a more seamless feel.

Specifically, a content distribution server according to this example is installed in a fixed manner, but is provided with a radio device, and distributes video, voice, and such like data communications to a plurality of communication terminal apparatuses. The connection mode may be one-to-one distribution or 1-to-N distribution.

On detecting that the radio field intensity has weakened due to an increase in the number of users, for example, device control section 21 of the content distribution server writes the changed radio status to the management database of lower layer management section 22. Similarly, on detecting an increase in the number of retransmissions, a change in the receive buffer size, or the like, network distribution control section 20 writes the changed value to the management database of lower layer management section 22. Such a phenomenon may occur when the field intensity of a distribution destination communication terminal apparatus is poor, or in the event of severance of the radio link.

Each time there is an update in the management database, lower layer management section 22 notifies connection control section 12 of the application. On receiving this notification, control is performed in connection control section 12 to reduce the amount of data coded if the signal is weak, change to a control method that lowers video image quality and gives priority to motion (smoothness) if the number of retransmissions has increased, and so forth, in the same way as described in the various examples given above.

While embodiments of the present invention have been described above, it is of course possible for persons skilled in the art to make various variations and modifications to the above-described embodiments without departing from the scope of the present invention.

As described above, according to the present invention, when a video and/or voice application requiring real-time capability is handled in a network system that includes mobile terminals whose communication conditions change from moment to moment as the terminal moves, switching to a service adapted to a change in communication conditions can be performed more rapidly on the application side, and communication that the user feels to be more seamless can be provided in a mobile environment.

This application is based on Japanese Patent Application No. 2003-021838 filed on Jan. 30, 2003, the entire content of which is expressly incorporated by reference herein.

INDUSTRIAL APPLICABILITY

The present invention is applicable to a communication control apparatus, communication terminal apparatus, server apparatus, and communication control method that are used in a mobile network system employing radio access points and radio base stations, and can provide users with conversational type and streaming type media services, for example.

The invention claimed is:

1. A communication control apparatus including a memory, the apparatus comprising:
 a detection section that detects at least one of a radio environment, comprising a radio communication field intensity and a modulation scheme for radio communication or a network environment in a layer below a transport layer, comprising identification information of a network with which the communication control apparatus is associated and a communication condition of the network,
 a lower layer management section that stores information of the detected radio environment or network environment in the memory of the apparatus, monitors whether or not a change has occurred in the radio environment or in the network environment and provides a monitoring result to an application layer, without the result being conveyed through the transport layer; and a control section that performs communication service control in the application layer, based upon the monitoring result received from the lower layer management section without the result being conveyed through the transport layer.

2. The communication control apparatus according to claim 1, wherein:

the lower layer management section monitors a change in the radio environment or in the network environment in the lower layer below the transport layer in an OSI (Open System Interconnection) hierarchical model; and the control section performs communication service control by means of the application layer, in accordance with the change in the environment in the lower layer below the transport layer.

3. The communication control apparatus according to claim 2, wherein the control section comprises a decision section that, when the change in the radio environment or in the network environment satisfies a predetermined condition, decides on a control operation for changing the communication service in accordance with the change in the radio environment or in the network environment.

4. The communication control apparatus according to claim 3, wherein the decision section changes operation relating to at least one of service quality in network transmission, signaling information transmission/reception, or transmit data transmission/reception.

5. The communication control apparatus according to claim 4, wherein:

the control section further comprises a notification section that, when negotiation with a communicating station is necessary, notifies the communicating station that a call involving the communicating station is to be updated; and the decision section decides on a control operation after a call has been updated.

6. A communication terminal apparatus comprising the communication control apparatus according to claim 1.

7. A server apparatus comprising the communication control apparatus according to claim 1.

8. A communication control method of a communication control apparatus, the method comprising:

detecting at least one of a radio environment, comprising a radio communication field intensity and a modulation scheme for radio communication or a network environment, comprising identification of a network with which the communication control apparatus is associated and a communication condition of the network, storing information of the detected radio environment or network environment, monitoring whether or not a change has occurred in the radio environment or in the network environment and providing a monitoring result to an application layer, without the result being conveyed through the transport layer; and performing communication service control in the application layer, based on the monitoring result received without the result being conveyed through the transport layer.

9. The communication control apparatus according to claim 1, the radio communication taking place between a transmitter and a receiver, the transmitter transmitting data and the receiver receiving data over the network.

* * * * *